MAGNETIC DATA TRANSFERRING DEVICE

Filed June 30, 1959

INVENTORS
Alfred Cutaia,
Frederick M. Demer &
Martin J. Kelly
BY Melvin P. Williams
AGENT 3,146,455
Patented Aug. 25, 1964

3,146,455

MAGNETIC DATA TRANSFERRING DEVICE

Alfred Cutaia, Endicott, Frederick M. Demer, Johnson City, and Martin J. Kelly, Endwell, N.Y., assignors to International Business Machines Corporation, New York, N.Y., a corporation of New York Filed June 30, 1959, Ser. No. 824,086
2 Claims. (Cl. 346—74)

This invention relates to a device for the selective transfer of data in magnetic form, and more particularly, to a device for selectively manifesting information in a magnetic record of the type adapted for use in data processing.

In data processing, the use of magnetic records has many advantages, particularly high speeds and freedom from the mechanical limitations inherent in punched cards. In some applications, it is frequently desirable to take blank record cards, or cards which have a certain amount of standard information printed or manifested therein, and use the cards to report from remote field operations, entering data by hand or with simple equipment at the field stations. Although it is a relatively simple matter to manually punch holes in a punched-hole type of record card, it has heretofore been difficult, if not impossible, to provide for the magnetic recording of discrete spots as a manual, or substantially manual operation at remote field stations, particularly if any degree of precision is required. In a copending application, Serial No. 823,903, Magnetic Data Processing, filed June 30, 1959, now Patent No. 3,100,834, by F. M. Demer and M. J. Kelly, a magnetic data processing method is disclosed. In that system, a magnetic unit record card is prepared from ordinary card stock by printing a plurality of discrete areas thereon with magnetizable ink, and thereafter recording a magnetic pattern on each spot in response to alternating current. The copending application also discloses as one step in the data processing method the selective erasure, in response to unilateral flux from a magnet, of such spots as are not used in the code of data which is to be stored in the card; in other words, this method contemplates erasure of the negative of the code of data which is desired to be manifested in the magnetic record card.

The primary object of our invention is to provide a device for selectively erasing magnetic flux in response to a unilateral magnetic force.

Another object of our invention is to provide a device which will selectively erase magnetic patterns in a manner so as to provide a maximum signal to noise ratio.

Another object of our invention is to provide a device for selectively erasing magnetic spots in a substantially manual operation.

Another object of our invention is to provide a shield or template which will pass unilateral erasing flux to select ones of a plurality of discrete areas without affecting the magnetic pattern of the unselected areas.

A further object of our invention is to pass flux through a magnetic record perpendicular to the primary plane thereof for selectively erasing flux patterns thereon.

Our invention contemplates use of a shield which selectively conducts magnetic flux to selected ones of a plurality of discrete areas on a prerecorded magnetic record.

The foregoing and other objects, features and advantages of the invention will be apparent from the following more particular description of preferred embodiments of the invention, as illustrated in the accompanying drawings.

Figures 1, 2, 3, 4:
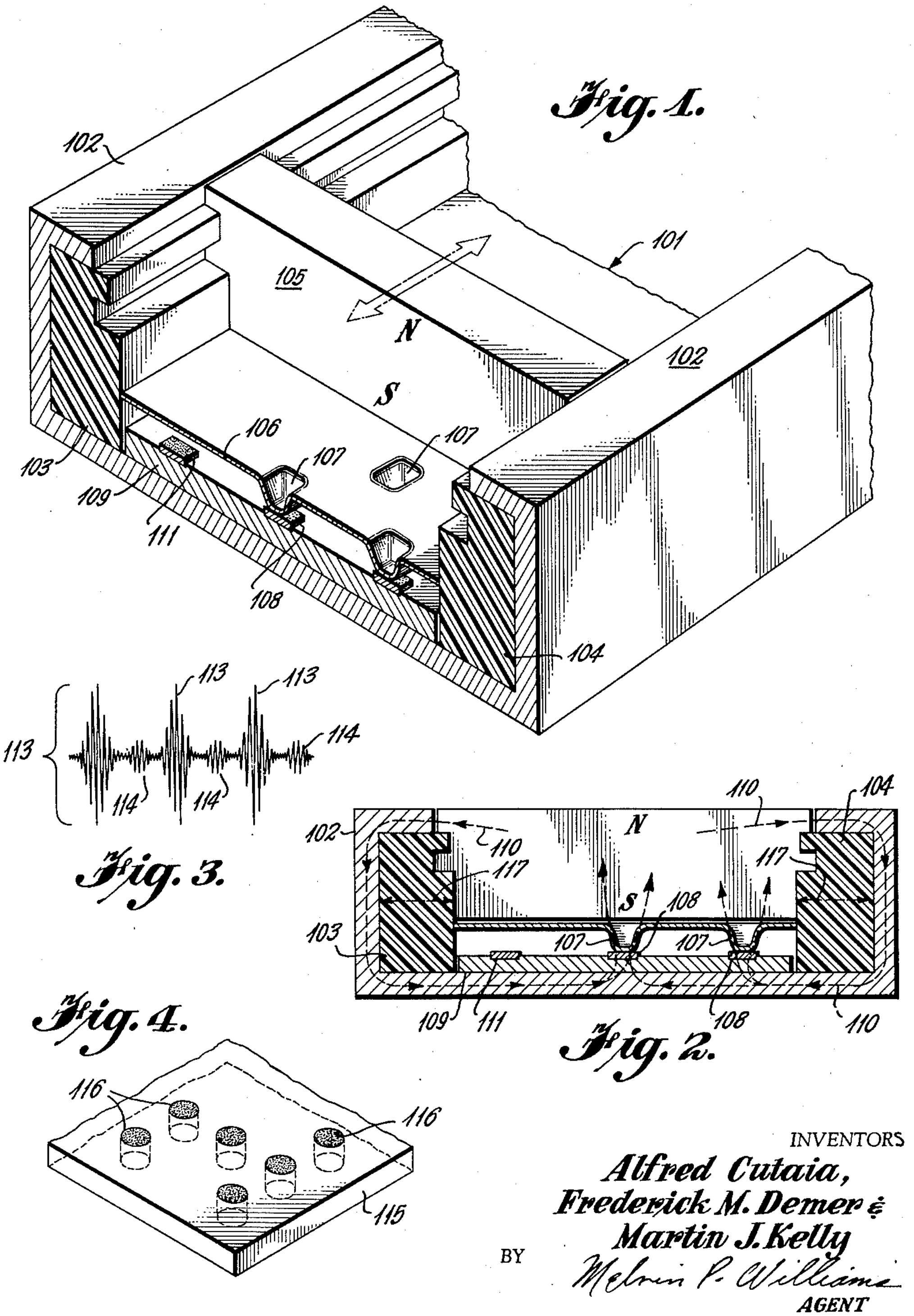
FIG. 1 is a partially sectioned perspective view of one embodiment of a magnetic data transferring device.
FIG. 2 is a detailed cross section of the device shown in FIG. 1.
FIG. 3 is a wave form diagram showing the signal to noise ratio obtainable after erasing every other discrete spot in a row using the device of FIGS. 1 and 2.
FIG. 4 is a partial perspective view of an alternative embodiment of the shield shown in FIGS. 1 and 2.

In FIG. 1, a holding device 101 consisting of an outside frame member 102 of magnetic material of any well-known type and inner sections 103, 104 of non-magnetic material, slidably restrains a magnet 105. The magnet is free to slide back and forth over a relatively thin embossed shield 106, which is also made of a magnetically conductive material. The embossed shield has dimples (or protrusions) 107 selectively embossed therein so as to correspond in position to discrete areas 108, 111 printed with magnetic ink on a record card 109. The operation of the device is more easily described with reference to FIG. 2. Each of the magnetic spots 108 printed on the card 109 has been subjected to a magnetic field in response to alternating current. The object is to erase the A.C. flux pattern and to substitute therefor a unilateral flux pattern in response to the magnetic force of the magnet 105. According to conventional notation, the flux lines 110 are conducted by the magnetic frame 102 from the north pole of the magnet 105, over to the side, down, and along the bottom of the frame 102 adjacent to the record card 109. The dimples 107 embossed in the shield 106 provide magnetically conductive paths for the lines of flux 110; the lines of flux, therefore, will pass from the bottom of the magnetic frame 102 through the magnetic spots 108 in the card 109, and be carried by the dimples 107 back to the south pole of the magnet 105. Any of the magnetic spots 111 which do not correspond to a dimple 107 embossed in the shield will not have any of the flux 110 pass therethrough because of the air gap 112 between the unembossed portions of the shield 106 and the magnetic spot 111. FIG. 3 shows the wave form that results from sensing a row of magnetic spots 108 having alternating flux patterns recorded therein, alternate ones of which have had the magnetic pattern erased as above described. The signal oscillations 113 are shown to be approximately six times as large as the noise fluctuations 114. This is a good signal to noise ratio for data processing, in which only the presence or absence of a bit of information need be sensed. In FIG. 4 is shown an alternative embodiment of the shield 106, wherein a non-magnetic plate 115 is fitted with magnetic plugs (or conductors) 116 which extend between the surfaces thereof; the plugs 116 correspond to the dimples 107.

The depth of the dimples 107 and the thickness of the plate 115 may be such as will provide a sufficiently large ratio of permeability of the path through the dimples 107 or plugs 116 to that of the path through the air gap 112 or plate 115 respectively, so as to guide substantially all of the flux 110 through the selected ones of the spots 108. The thickness 117 of the non-magnetic inner sections 103, 104 should be large enough so that very little flux 110 will tend to leak through them.

A device which embodies our invention in a credit card registering machine is shown in copending application Serial No. 834,989, Unit Document Originating Machine, filed by A. E. Gray on even date herewith, now U.S. Patent No. 3,075,194.

It is not necessary that the holding device 101 and the magnet 105 be designed for slidability of the magnet; this is merely a simple way to cause a relatively small magnet to exert its influence over the entire dimensions of the record card 109. For instance, any statically disposed sandwich of a record card 109 having discrete magnetic spots 108, a selectively embossed shield 106, and a vertically polarized magnet 105, having a return path for flux substantially as shown in FIG. 2, would perform the same function.

While the invention has been particularly shown and described with reference to preferred embodiments thereof, it will be understood by those skilled in the art that the foregoing and other changes in form and details may be made therein without departing from the spirit and scope of the invention.

We claim:

1. In a device for recording data on a card having a matrix of pre-magnetized spots thereon, means forming a magnetically conductive path including a bed to receive the card; a magnet; and a masking plate between said magnet and the card having means to guide magnetic flux from the magnet to selected ones of said spots.

2. In a device for demagnetizing selected spots of a matrix of pre-magnetized spots on a record card, supporting means for the card including a magnetically conductive bed; a masking plate adapted to be laid over the record card on said bed; said plate having magnetically conductive elements positioned in close proximity to the spots selected for demagnetization; and means to generate a magnetic field passing through said magnetically conductive elements, the adjacent spots on said card, and said bed.

References Cited in the file of this patent

UNITED STATES PATENTS

| | | |
|---|---|---|
| 2,359,617 | Bryce | Oct. 3, 1944 |
| 2,743,988 | Allyn | May 1, 1956 |
| 2,793,135 | Sims et al. | May 21, 1957 |
| 2,844,434 | Beard | July 22, 1958 |
| 2,894,798 | Potter | July 14, 1959 |
| 2,914,756 | Heidenhain et al. | Nov. 24, 1959 |
| 2,950,161 | Rueger | Aug. 23, 1960 |

UNITED STATES PATENT OFFICE

CERTIFICATE OF CORRECTION

Patent No. 3,146,455 August 25, 1964

Alfred Cutaia et al.

It is hereby certified that error appears in the above numbered patent requiring correction and that the said Letters Patent should read as corrected below.

Column 1, line 16, for "speeds" read -- speed --; column 2, line 50, for "may" read -- must --.

Signed and sealed this 12th day of January 1965.

(SEAL)
Attest:

ERNEST W. SWIDER
Attesting Officer

EDWARD J. BRENNER
Commissioner of Patents